United States Patent [19]
Dunne

[11] Patent Number: 5,503,222
[45] Date of Patent: Apr. 2, 1996

[54] CAROUSEL HEAT EXCHANGER FOR SORPTION COOLING PROCESS

[75] Inventor: Stephen R. Dunne, Bethel, Conn.

[73] Assignee: UOP, Des Plaines, Ill.

[21] Appl. No.: 282,137

[22] Filed: Jul. 28, 1994

Related U.S. Application Data

[63] Continuation-in-part of Ser. No. 124,740, Sep. 21, 1993, Pat. No. 5,456,093, which is a continuation-in-part of Ser. No. 895,975, Jun. 9, 1992, Pat. No. 5,260,243, which is a continuation-in-part of Ser. No. 386,319, Jul. 28, 1989, Pat. No. 5,120,694.

[51] Int. Cl.$^6$ ............................................. F28D 15/00
[52] U.S. Cl. .................. 165/104.12; 165/10; 62/478; 62/480; 502/527
[58] Field of Search ....................... 165/104.12, 9, 165/10, 104.22; 62/480, 478; 502/527; 427/23, 234, 237, 238, 239

[56] References Cited

U.S. PATENT DOCUMENTS

| | | | |
|---|---|---|---|
| 1,586,817 | 6/1926 | Ljungström | 165/8 X |
| 4,034,569 | 7/1977 | Tcherney | 62/2 |
| 4,063,587 | 12/1977 | Stockman | 165/8 |
| 4,138,850 | 2/1979 | Tchernev | 60/64 |
| 4,138,861 | 2/1979 | Wurm | 62/480 |
| 4,169,362 | 10/1979 | Weil et al. | 62/478 |
| 4,410,028 | 10/1983 | Alefeld et al. | 165/1 |
| 4,513,807 | 4/1985 | Rose et al. | 165/8 X |
| 4,548,046 | 10/1985 | Brandon et al. | 62/79 |
| 4,637,218 | 1/1987 | Tchernev | 62/106 |
| 4,660,629 | 4/1987 | Maier-Laxhuber et al. | 165/104.12 |
| 4,674,563 | 6/1987 | Maier-Laxhuber et al. | 165/104.12 |
| 4,924,676 | 5/1990 | Maier-Laxhuber et al. | 62/59 |
| 4,976,308 | 12/1990 | Faghri | 165/10 |
| 5,000,252 | 3/1991 | Faghri | 165/10 |
| 5,054,544 | 10/1991 | Maier-Laxhuber et al. | 165/104.12 |
| 5,157,937 | 10/1992 | Choung et al. | 62/478 X |
| 5,279,359 | 1/1994 | Erickson | 165/104.12 |

OTHER PUBLICATIONS

S. C. Chang, Roux, J. A. "Thermoynamic Analysis of a Solar Zeolite Refrigeration System," Journal of Solar Energy, Aug. 1985, vol. 107 pp. 189–195.

Soon–Haeng Cho et al., "Silica Gel/Water Adsorption–Cooling System" Paper presented at Sorption Refrigeration Symposium, Paris, France, Nov. 18–20, 1992, pp. 106–110.

Motoyuki Suzuki, "Application of Adsorption Cooling System to Automobiles" presented at Solid Sorption Refrigeration Symposium, Paris, France Nov. 18–20, 1992, pp. 136–141.

*Primary Examiner*—John Rivell
*Assistant Examiner*—Christopher Atkinson
*Attorney, Agent, or Firm*—Thomas K. McBride; John G. Tolomei; Richard P. Silverman

[57] ABSTRACT

A carousel heat exchanger is provided for air conditioning or waste heat recovery applications. The carousel heat exchanger includes a plurality of heater tubes disposed radially about a rotational axis. Each of the heater tubes is sealed and has a hollow bore which is uniformly lined with a solid adsorbent and contains a refrigerant. A baffle is disposed about the rotational axis such that to the heater tubes extend transversely therethrough. The baffle defines an outer zone to the outside of the baffle and an inner zone to the inside of the baffle and divides the heater tubes into a first internal zone of the heater tubes located in the outer zone and a second internal zone of the heater tubes located in the inner zone. A plurality of vanes is disposed radially along the rotational axis. The vanes extend transversely from both sides of the baffle, defining a plurality of axial flow segments that subdivide the inner and outer zones. A manifold moving a flow of a heat carrier into a portion of the axial flow segments in the outer and the inner zones is provided. Using the carousel heat exchanger of the present invention, particularly with an adsorbent selected from the group consisting of zeolite Y-54, zeolite Y-85, calcined low cerium rare earth exchanged zeolite Y-84 and calcined rare earth exchanged LZ-210, can result in significant improvements in cooling and waste heat recovery system power per unit-mass of sorbent, and can simplify the manufacture of sorption cooling systems.

13 Claims, 3 Drawing Sheets

CAROUSEL HEAT EXCHANGER FOR SORPTION COOLING PROCESS

CROSS-REFERENCE TO RELATED APPLICATIONS

This application is a continuation-in-part of application Ser. No. 124,740, filed Sep. 21, 1993 now U.S. Pat. No. 5,456,093, which is a continuation-in-part of Ser. No. 895,975, filed Jun. 9, 1992 now U.S. Pat. No. 5,260,243, which is a continuation-in-part of application Ser. No. 386,319, filed Jul. 28, 1989 and issued on Jun. 9, 1992 as U.S. Pat. No. 5,120,694 and the above are herein incorporated by reference.

FIELD OF THE INVENTION

The present invention relates in general to adsorbent composites and more particularly to methods for coating the inside surface of a tube with a layer of solid adsorbent to form an adsorbent-lined tube and for utilizing the adsorbent-lined tube in an apparatus useful for sorption cooling.

BACKGROUND OF THE INVENTION

Some thermodynamic processes for cooling and heating by adsorption of a refrigerating fluid on a solid adsorbent use zeolite and other sorption materials such as activated carbon and silica gel. In these processes, the thermal energy from adsorbing zeolite in one place is used to heat desorbing zeolite located in another place. U.S. Pat. No. 4,138,850 relates to a system for such solar heat utilization employing a solid zeolite adsorbent mixed with a binder, pressed, and sintered into divider panels and hermetically sealed in containers. U.S. Pat. No. 4,637,218 relates to systems for a heat pump using zeolite as an adsorbent wherein the zeolite is prepared by slicing natural zeolite rock with a carbide saw, or by pressing slightly-wetted, powdered zeolite into bricks. The bricks used in U.S. Pat. No. 4,637,218 are preferably not more than 10 mm in thickness.

U.S. Pat. No. 4,548,046 relates to an apparatus for cooling or heating by adsorption of a refrigerating fluid on a solid adsorbent. The operations employ a plurality of tubes provided with parallel radial fins filled or covered with solid adsorbent such as Zeolite 13X located on the outside of the tubes.

The thermodynamic aspects of developing a zeolite-water adsorption refrigeration unit are well known. An article entitled, *"Thermodynamic Analysis of a Solar Zeolite Refrigeration System,"* by S. Chang and J. A. Roux, which appeared in the Journal of Solar Energy Engineering, August 1985, Volume 107, pages 189–194 provides a discussion of the main parameters, including adsorber properties.

In adsorber/generator based cooling systems the most significant parameter is the overall heat transfer coefficient between the adsorbent bed and the cooling or heating gases per unit weight of adsorbent in the system. This parameter has been related in the literature to the cooling power per kilogram of adsorbent. The higher the cooling power, the more efficient the adsorber/generator system. Current systems are limited by requiring a high adsorbent regenerator temperature or a long cycle time to achieve relatively low cooling power values.

In a paper titled, "Application of Adsorption Cooling System to Automobiles," by Moloyuki Suzuki, presented at the Solid Sorption Refrigeration Symposium—Paris, France, Nov. 18–20, 1992. Suzuki disclosed the results of a study to particularly point out the technological limits associated with the application of adsorption cooling systems to passenger car air conditioning. Suzuki's model considered an adsorbent bed wherein the adsorption step corresponds to the cooling step where water evaporation takes place at a water container, and wherein regeneration step corresponding to a generation step where the adsorbent bed is heated by exhaust gases to desorb the water. These steps are repeated in series requiring at least two units to achieve continuous cooling. Suzuki suggests the use of "quick cycles with a high overall heat transfer coefficient will result in acceptable designs. Currently, overall heat transfer coefficients in the ranges of 25 to 50 are reported in a paper titled, "Reaction Beds for Dry Sorption Machines," by M. Groll and presented at the above mentioned Solid Sorption Refrigeration Symposium. Suzuki predicts a threshold value of 100 $kW/m^3K$ for overall heat transfer coefficient as a target for the future work, and further points out the need for systems with mechanical strength for use in automobiles, but does not suggest how this value which is greater than 3 times the ability of the current art can be achieved.

U.S. Pat. No. 5,279,359 to Erickson discloses an apparatus and a process for sorption heat pumping using a multiplicity of intermittent cyclic triplex sorption modules. The cyclic triplex sorption modules comprise hermetically sealed tubes, each of which contains at least two solid sorbents and filled with a refrigerant. The preferred refrigerant is ammonia and the solid sorbents are salts such as $BaCl_2$, $SiCl_2$, $Ca Cl_2$, $MnCl_2$, $FeCl_2$ and $SiBr_2$.

U.S. Pat. No. 4,660,629 to Maier-Laxhuber et al. discloses a continuous adsorption cooling device comprising a plurality of adsorption containers filled with adsorbent wherein the adsorption containers are rotated through flow segments which form passageways for a heat carrier stream. The adsorption containers contain an adsorption substance from which an operating substance is extracted by absorbing heat from a heat carrier flow and into which the operating substance is readsorbed, emitting heat to a further heat carrier flow.

Prior methods of using zeolite adsorbents in devices for cooling or heating by adsorption of a refrigerating fluid on a solid adsorbent have been inefficient and difficult to prepare. Those methods of preparation included cutting natural rock into thin bricks and mounting these bricks on to heat exchange surfaces or casting powdered zeolites and mixtures thereof with clays into panels or slabs for direct contact with fluids. Prior devices have sought to minimize heat transfer losses in systems for sorption cooling by employing flat containers filled with adsorbent suspended in heat carrier streams, or their slabs of adsorbent wired or mounted next to heat transfer surfaces. Many of these devices incorporated further flow enhancers such as sorbate conduits, weirs, valves, and wicks to establish maximum contact of the operating fluid and the adsorbent with heat exchange surfaces. Devices are sought which simplify the manufacture of sorption cooling systems and improve the overall system power per unit-mass of sorbent.

It is the object of the instant invention to provide an improved sorption cooling device for use in waste heat recovery and air conditioning systems.

It is a further objective of the instant invention to provide an adsorbent/refrigerant system which provides a high overall efficiency within the limits of typical waste heat recovery and air conditioning cycles.

SUMMARY OF THE INVENTION

To attain the above objects, the present invention provides a carousel heat exchanger including a plurality of heater tubes each being rotatable together about a rotational axis. The heater tubes are sealed and each has a hollow bore. The hollow bore is uniformly lined with a solid sorbent and contains a refrigerant. A baffle is disposed about the rotational axis and the heater tubes pass transversely therethrough. The baffle defines an outer zone and an inner zone defining a first internal zone of the heater tubes located to the outside of the baffle in the outer zone and a second internal zone of the heater tubes located to the inside of the baffle in the inner zone. A plurality of vanes is disposed radially along the rotational axis and extends transversely from both sides of the baffle. The vanes define a plurality of axial flow segments that subdivide the inner and outer zone. A manifold is provided for moving the flow of a heat carrier into a portion of the axial flow segments in the outer and the inner zones.

The manifold for moving the flow of a heat carrier into the flow segments may be characterized by a flow distributor disposed at a face end and a distal end of the heater tube, baffle, and vane assembly and at least two seal zones for directing a heat carrier axially through the inner and outer zones. The axial flow segments are rotated about the rotational axis while the flow distributor remains in a fixed position such that the heater tubes are moved through zones where either the first internal zone of the heater tubes or the second internal zone of the heater tubes is heated or cooled according to its position relative to the flow distributor and the temperature of the heat carrier that is passed therethrough. Conversely, the invention may include a manifold for moving the flow of a heat carrier into a portion of the axial flow segments wherein the flow distributor is rotated about the rotational axis relative to the stationary plurality of axial flow segments.

The present invention provides heater tubes wherein solid sorbents are bonded to the inside surfaces of tubes comprised of materials such as aluminum metal, copper metal, aluminized steel, copperclad steel, steel, or aluminized ceramic. These heater tubes provide composite linings that have improved adsorption properties over pelleted or beaded adsorbent particles as well as providing excellent physical and thermal cycling properties.

BRIEF DESCRIPTION OF THE FIGURES

FIG. 2A is a diagrammatic illustration of a sorption cooling apparatus of the present invention for conditioning vapor streams with the flow distributor removed and the casing partially broken away to show a detail of the heater tubes, the baffle and vanes.

DETAILED DESCRIPTION OF THE INVENTION

Figure 1A:
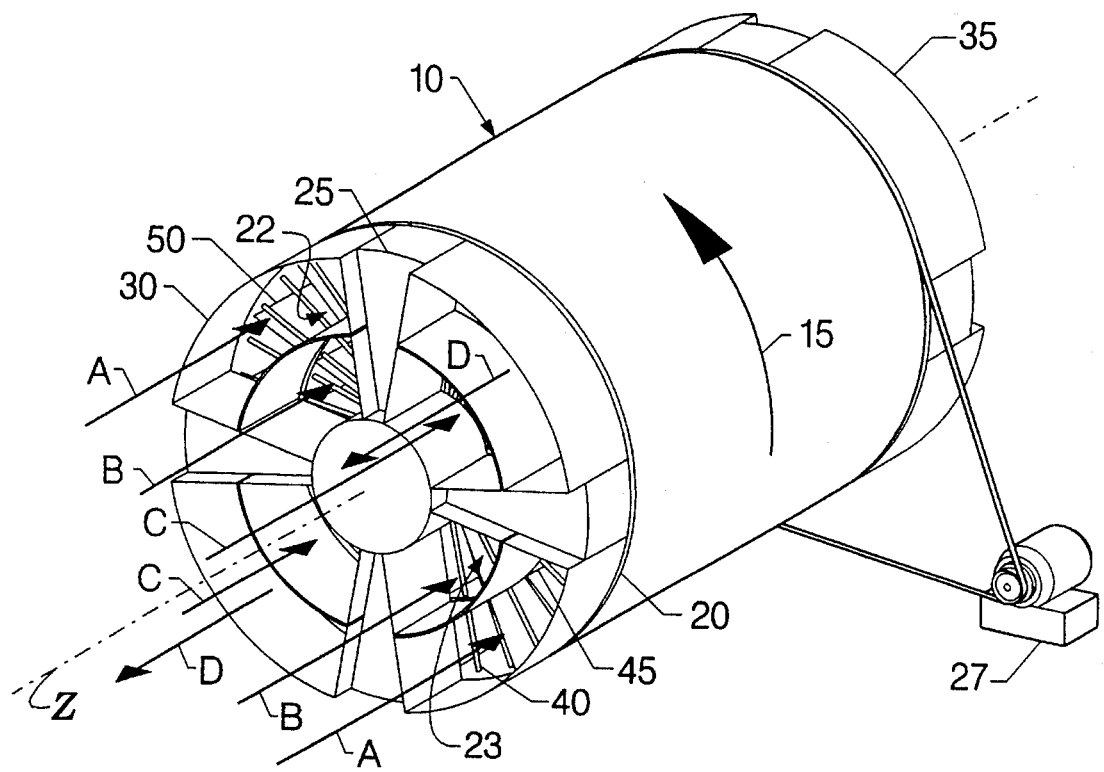
FIG. 1A is a diagrammatic illustration of a sorption cooling apparatus of the present invention for conditioning fluid streams.

The heater tubes of the present invention provide a significant advance in the art of sorption cooling and their application to a carousel heat exchanger is unique. The tubes used in the present invention provide a heat transfer surface and structural support for the solid sorbent layer as well as provide a suitable bonding medium for the solid sorbent and a binder. The tubes may be, for example, copper, steel, aluminum metal, steel, glass, aluminized ceramic and other similar materials. It is not necessary for the tubes to be chemically treated or washed with solvent in order to practice the present invention, however the inside surface of the tube should be relatively free from large amounts of foreign matter which may adversely affect bonding, such as dirt or grease. It is preferred to employ methods such as sand blasting to remove foreign matter from the tube inside surface.

Virtually any synthetic or naturally occurring solid sorbent capable of maintaining its physical integrity during the coating process is suitable for use according to the present invention. The selection of the particular solid adsorbent will depend on factors such as its effective pore diameter and the particular end use intended. The term "effective pore diameter" is conventional in the art and is used herein to functionally define the pore size in terms of the size of molecules that can enter the pores rather than actual dimensions which are often difficult to determine as the pores are often irregularly shaped, i.e., non-circular. D. W. Breck, in *Zeolite Molecular Sieves,* John Wiley and Sons, New York, 1974, at pages 633 to 641, provides a discussion of effective pore diameter which is hereby incorporated by reference.

Although there are a variety of solid sorbents which are suitable for use according to the present invention including but not limited to activated carbons, activated clays, silica gel, activated alumina and crystalline molecular sieves, molecular sieves are preferred for adsorption and catalysis because of their uniform pore size, i.e., effective pore diameter.

Zeolitic molecular sieves in the calcined form may be represented by the general formula:

$$Me_{2/n}O:Al_2O_3:xSiO_2:yH_2O$$

where Me is a cation, n is the valence of the cation, x has a value from about 2 to infinity and y has a value of from about 2 to 10.

Typical well known zeolites which may be used include, chabazite, also referred to as Zeolite D, clinoptilolite, erionite, faujasite, also referred to as Zeolite X and Zeolite Y, ferrierite, mordenite, Zeolite L, Zeolite A, and Zeolite P. Detailed descriptions of the above-identified zeolites, as well as others, may be found in D. W. Breck, *Zeolite Molecular Sieves,* John Wiley and Sons, New York, 1974, hereby incorporated by reference. Other zeolites suitable for use according to the present invention are those having a high silica content, i.e. those having silica to alumina ratios greater than 10 and typically greater than 100. One such high silica zeolite is silicalite, as the term used herein includes both the silicapolymorph disclosed in U.S. Pat. No. 4,061, 724 and also the F-silicalite disclosed in U.S. Pat. No. 4,104,294, hereby incorporated by reference.

Zeolites which are preferred for use in the present invention are those zeolites which permit the desorption of water at moderate to low temperatures and have a relatively low heat capacity. Such preferred zeolites may be selected from the group consisting of X and Y zeolites, and more particularly are selected from the group consisting of zeolite Y-54, zeolite Y-85, low cerium rare earth exchanged zeolite Y-84 and rare earth exchanged LZ-210. Zeolite Y-85 is a steam stabilized modified zeolite Y the preparation of which is disclosed in U.S. Pat. No. 5,208,197 in column 7, line 16 to column 8 line 40 and is herein incorporated by reference. The low cerium rare earth exchanged zeolite Y-84 is prepared in a manner similar to the preparation of Y-85, except that the second ammonium ion exchange is carded out in the conventional manner at a pH well above 4.0 and the resulting zeolite is subjected to a rare earth exchange by contacting the zeolite with an aqueous solution of rare earth salt in the known manner. A mixed rare earth chloride salt can be added to an aqueous slurry of the ammonium exchanged zeolite to yield a zeolite product having a rare earth content generally in the range of 3.5 to 12.0 weight percent rare earth as $RE_2O_3$. The product is then water washed and calcined in dry air at a temperature of from about 55° C. to about 850° C., preferably 600° C. to about 750° C. for a period of time to reduce the unit cell dimension to less than 24.6 Angstrom and more particularly in the range of 24.4 to 24.6 Angstroms. The final low cerium rare earth exchanged zeolite Y-84 (CREY-84) has a cerium content less than about 0.2 weight percent. Zeolite LZ-210 is defined in a U.S. Pat. No. 4,503,023 in column 12, lines 5–68. The rare earth exchanged zeolite LZ-210 may be prepared by subjecting the LZ-210 to a conventional rare earth exchange step followed by the dry air calcination step described above. U.S. Pat. No. 4,503,023 is hereby incorporated by reference.

For purposes of the present invention it is required that the solid sorbent be agglomerated with a binder in order to ensure that the coating will have suitable physical properties. Although there are a variety of synthetic and naturally occurring binder materials available such as metal oxides, clays, silicas, aluminas, silica-aluminas, silica-zirconias, silica-thorias, silica-berylias, silica-titanias, silica-alumina-thorias, silica-alumina-zirconias, mixtures of these and the like, clay type binders are preferred. Examples of clays which may be employed to agglomerate the zeolites without substantially altering the adsorptive properties of the zeolite are attapulgite, kaolin, volclay, sepiolite, halloysite, palygorskite, kaolinite, bentonite, montmorillonite, illite and chlorite. A kaolin binder in combination with silica is particularly preferred for practicing the present invention. The addition of a small amount of silica to the binder surprisingly permitted the bonding of the solid adsorbent to high conductivity materials such as copper and steel, as well as aluminized surfaces. The preferred amount of silica in the binder ranges from about 5 to 40 wt. % and more particularly ranges from about 20 to about 30 wt. % of the binder. It is to be understood that certain solid sorbents, such as activated alumina, can function adequately as both the sorbent and the binder. Hence, in such a case, it is not necessary to utilize an additional binder. However, it may nonetheless be advantageous to use an additional binder, such as clay, for economic reasons, etc.

According to the present invention the tube inside surface is coated with the solid sorbent by contacting the surface of the tube, after heating the surface as hereinafter described, with a slurry comprising the solid sorbent and binder. The solid particles used in the slurry including both the solid sorbent and binder material may be of any size functionally suitable in the present invention. However, the solid sorbent and binder are desirably present as small particles, preferably having a particle size of from about 0.1 to 50 microns more preferably from about 0.1 to 5 microns.

If necessary, the solid particles may be subjected to mechanical size reduction, e.g., grinding, crushing, milling and the like, in order to obtain the desired particle size. However, it is preferred that the solid particles be more smooth, and more preferably also more spherical, relative to solid particles of similar composition obtained by mechanical size reduction. Such particle smoothness and sphericity tends to improve evenness of the coating and may also allow increased solids loading in the slurry, if desired. One particularly useful processing step to achieve such smoothness and sphericity is to employ spray drying as part of the said particle manufacturing process to form the solid particles or precursors of the solid particles. An additional advantage of employing such spray drying is that the conditions of such step can be controlled so that the product solid particles are of a desired particle size or size range. The use of spray drying in such solid particle manufacturing is conventional and well known, and therefore need not be discussed in detail here. It is to be understood that the solid sorbent and binder may be agglomerated and subjected to size reduction prior to forming the slurry, if desired.

The solid sorbent and binder may be mixed in the slurry in a variety of proportions, whether as segregated or agglomerated particles, although it is generally desirable to use only as much binder as is required to give sufficient strength to the coated surface. It is preferred that the adsorbent portion comprises about 60 to 95 wt. % of the total weight of solids, i.e, sorbent and binder, in the slurry and that the remaining 5 to 40 wt. % comprises binder. In addition to the sorbent and binder, the slurry may contain a dispersing agent or surfactant to aid in suspending the particles or vary the viscosity of the slurry. Suitable surfactants include for example, Dispex, a salt of a polymeric carboxylic acid available from Allied Colloids, Suffolk, Va., and TSPP, a tetrasodium pyrophosphate available from Monsanto, St. Louis, Mo. When a surfactant or dispersing agent is used, it is preferred that its concentration be in the range of about 0.5 to 5.0 wt. % of the solids content of the slurry.

While it can be appreciated that the solid sorbent and binder can be suspended in a dry slurry, i.e., fluidized bed, it is desirable in accordance with the present invention that the slurry contain a suspending liquid. The suspending liquid should be one which is not likely to chemically react, e.g., by itself or with the substrate or other components in the slurry. More preferably, the suspending liquid should be substantially non-reactive and should not interfere with the internal pores of the solid adsorbent. Water is a preferred suspending liquid for use according to the present invention. The proportion of suspending liquid can be varied to adjust the viscosity of the slurry and hence, the thickness of the coating. The determination of the appropriate proportions to achieve the desired coating thickness can be made experimentally by measuring the thickness resulting from a given slurry and then either increasing the solids proportion, i.e. higher viscosity, to obtain a thicker coating, or decreasing the solids proportion, i.e., lower viscosity, to obtain a thinner coating. One way to determine the thickness of the coating is to calculate the area density coverage, i.e., the weight of solid sorbent per unit area, and then divide by the density of the solid adsorbent. It is generally preferred that the solid materials comprise about 10 to 50 wt. %, and preferably about 20 to 50 wt. % of the total weight of the slurry, and more preferably about 25 to about 45 wt. % of the slurry with the balance preferably consisting essentially of the suspending liquid and any surfactants or dispersing agents.

In order to ensure sufficient bonding of the solid sorbent to the tube inside surface, it is necessary to heat the inside surface of the tube in an oxygen containing atmosphere, preferably containing at least about 1 mol % oxygen and more preferably consisting of air, to a temperature of at least 100° C.

The heated surface is then contacted with the slurry, preferably by dipping the surface into the slurry or by spraying the slurry onto the surface to form a slurry-coated surface. In the case of coating the inside surface of a tube, it was found that heating the tube, spinning the heated tube at speeds of up to 300 revolutions per minute and contacting the spinning tube with the slurry provided an efficient method of uniformly coating the surface. This procedure resulted in adsorbent lined tubes with an adsorbent density of up to about 10 gm per linear foot of tubing.

The sorbent coated surface is heated to a temperature and for a period of time sufficient to cause hardening of the coated surface. This temperature should be at least about 200° C., preferably between about 400° C. and 650° C., and most preferably between about 550°–650° C. The time required to cause hardening of the coated surface is desirably at least 0.1 hours and less than about 1 hour.

The resulting sorbent-substrate composite comprises an underlying metallic layer and another layer bonded to the surface of the metallic substrate consisting essentially of sorbent and binder. These coatings provide a high surface area as well as a minimum diffusion path for the components adsorbed on the sorbent and hence, superior rates of adsorption compared to pelleted or beaded forms of adsorbent. Moreover, the adsorbent coatings have excellent physical durability and are resistant to chipping and flaking. Furthermore, despite differences in the thermal expansion properties between the sorbent and the metallic substrate, the sorbent coatings of the present invention advantageously retain their physical integrity even after repeated thermal cycling. In addition, the adsorbent layer has a uniform thickness ranging from 0.6 to 3.0 mm, and preferably ranging from 1.0 to 2.0 mm, thus, the adsorbent coating provides an acceptably small thermal resistance.

The coated tubes are typically evacuated to a high vacuum of at least 1 micron of mercury at a temperature of at least 350° C. for a period of at least about 2 to 4 hours, filled with a refrigerant, such as water, propane, butane, ammonia, $CO_2$, $SO_2$, sulfur hexafluoride, HCFC, hydrochlorofluorocarbon, CFC, chlorofluorocarbon, and HFC, hydrofluorocarbon refrigerants such as Refrigerant 11, Refrigerant 12, Refrigerant 21, and Refrigerant 22, light alcohols and mixtures thereof, and sealed in a closed system by either sealing both ends of the tube or by providing a closed refrigerant circuit comprising a reservoir, an evaporator, and a condenser.

The apparatus of the invention to refrigerate a feedstream from an available temperature to a lower desired temperature uses a series of sequential process steps. A first fluid at a hot fluid temperature is passed to a first portion of an outer rotational zone of a carousel heat exchanger containing at least one heater tube. The heater tube has an inner space containing a refrigerant. The inner space is divided into a first internal zone located in the outer rotational zone and a second internal zone located in the inner rotational zone of the carousel heat exchanger. The heater tube is prepared in the manner described hereinabove and has a uniform lining of a solid adsorbent. The passing of the hot, first fluid on the outside of the heater tube causes the refrigerant adsorbed therein to be desorbed to produce a vaporized refrigerant stream. The vaporized refrigerant stream is passed to the second zone of the heater tube. Simultaneously, a second fluid at a second temperature, preferably at ambient fluid temperature is passed to a first portion of the inner rotational zone of the carousel heat exchanger. In the inner rotational zone, the second fluid contacts the outside of the heater tube, cooling the second internal zone of the heater tube resulting in the condensation and readsorption of at least a portion of the refrigerant within the second internal zone of the heater tube. As the carousel is rotated about the axis of rotation, a third fluid at ambient conditions is passed to a second portion of the outer rotational zone, thus removing heat from the first internal zone. Simultaneously, the feedstream to be cooled is passed to a second portion of the inner rotational zone and the feedstream at the lower desired temperature is withdrawn. The rotation of the carousel thereby provides continuous cooling.

The invention will now be described in detail with reference to the embodiment thereof. Referring to FIG. 1a, the reference numeral 10 designates the carousel heat exchanger having a casing 20 and a manifold or flow distributor 30 at a face end and a second manifold or flow distributor 35 at a distal end. The manifold provides for moving the flow of a heat carrier into a portion of the axial flow segments defined by baffle 45 and a plurality of vanes 50. The carousel heat exchanger comprises a plurality of heater tubes 40 disposed radially about a rotational axis, Z. The heater tubes, vanes, and baffle 45 are rotatable as a unit about the rotational axis, Z in the direction indicated by 15. The heater tubes extend from an inner cylinder 21 to a casing 20. A plurality of vanes 50 are disposed radially along the rotational axis and extend from inner cylinder 21 to the casing 20. A cylindrical baffle 45 having a central axis that coincides with the rotational axis Z divides the axial flow segments to define an outer rotational zone 22 and an inner rotational zone 23.

FIG. 2a is a cut away view of the carousel heat exchanger of FIG. 1a showing one embodiment illustrating the plurality of heater tubes 40 disposed radially about the rotational axis and a baffle 45. A casing 20 surrounding the heater tubes and vanes is partially cut away to expose the heater tubes 40 and an inner cylinder 21. The baffle, having the heater tubes 40 passing transversely therethrough, defines the first internal zone of the heater tubes located to the outside of the baffle 45 and the second internal zone of the heater tubes located to the inside of the baffle 45. The heater tubes 40 are disposed within the axial flow segments defined by a plurality of vanes 50 which are disposed radially about the rotational axis Z.

Figure 2B:
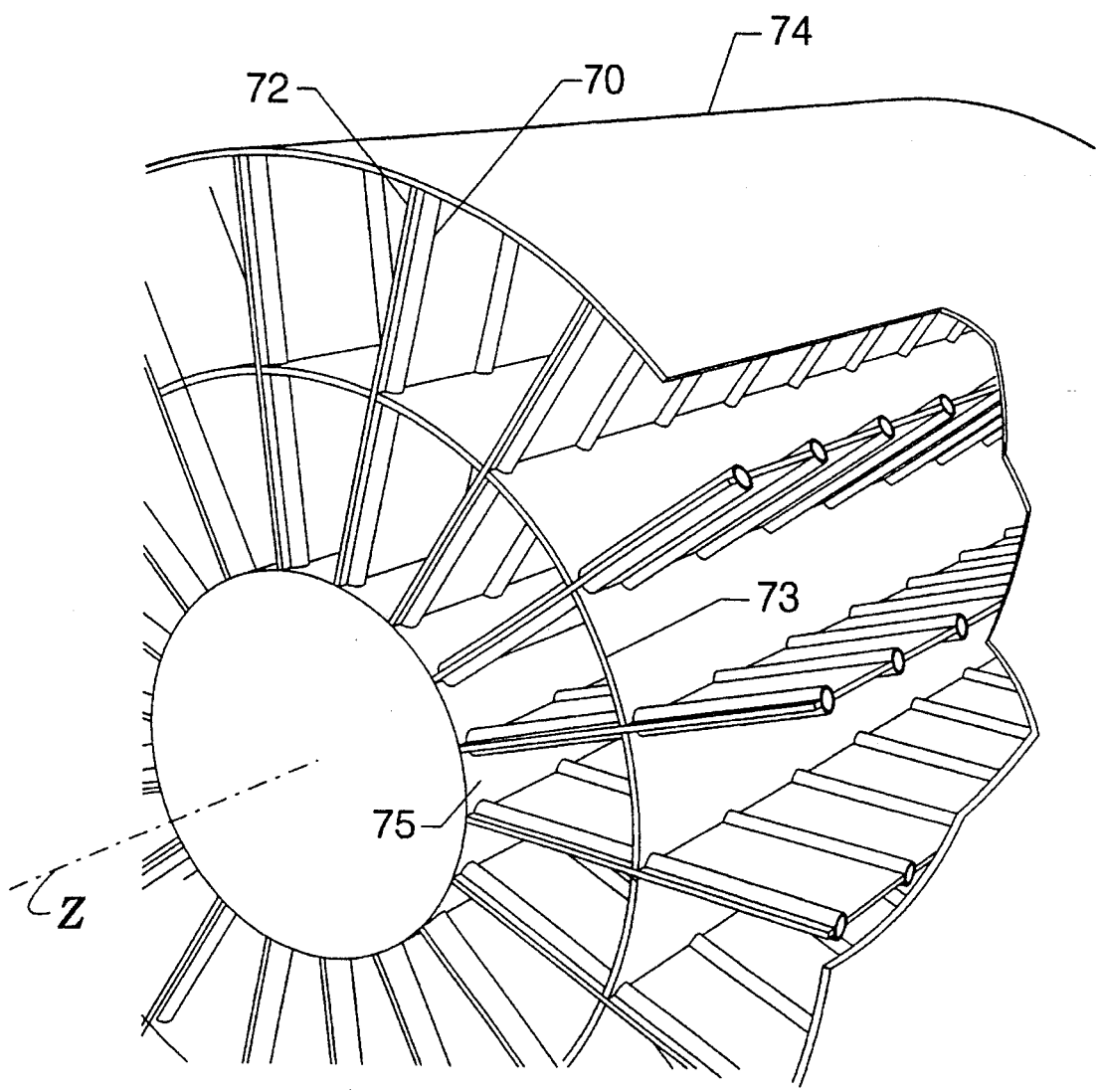
FIG. 2B is an illustration of a modified apparatus wherein the heater tubes are rigidly disposed on the vanes.

FIG. 2b illustrates another embodiment of the carousel heat exchanger as seen in a cut away view wherein the heater tubes 70 are rigidly disposed on the vanes 72. The baffle 73 is disposed radially about the rotational axis defining an inner and an outer zone within the axial flow segments defined by the plurality of vanes. The vanes extend transversely from both sides of the baffle 73 and may be rigidly attached to the casing 74 and the inner cylinder 75 to provide support for the heater tubes. The heater tubes 70 pass transversely through the baffle 73.

Figure 3:
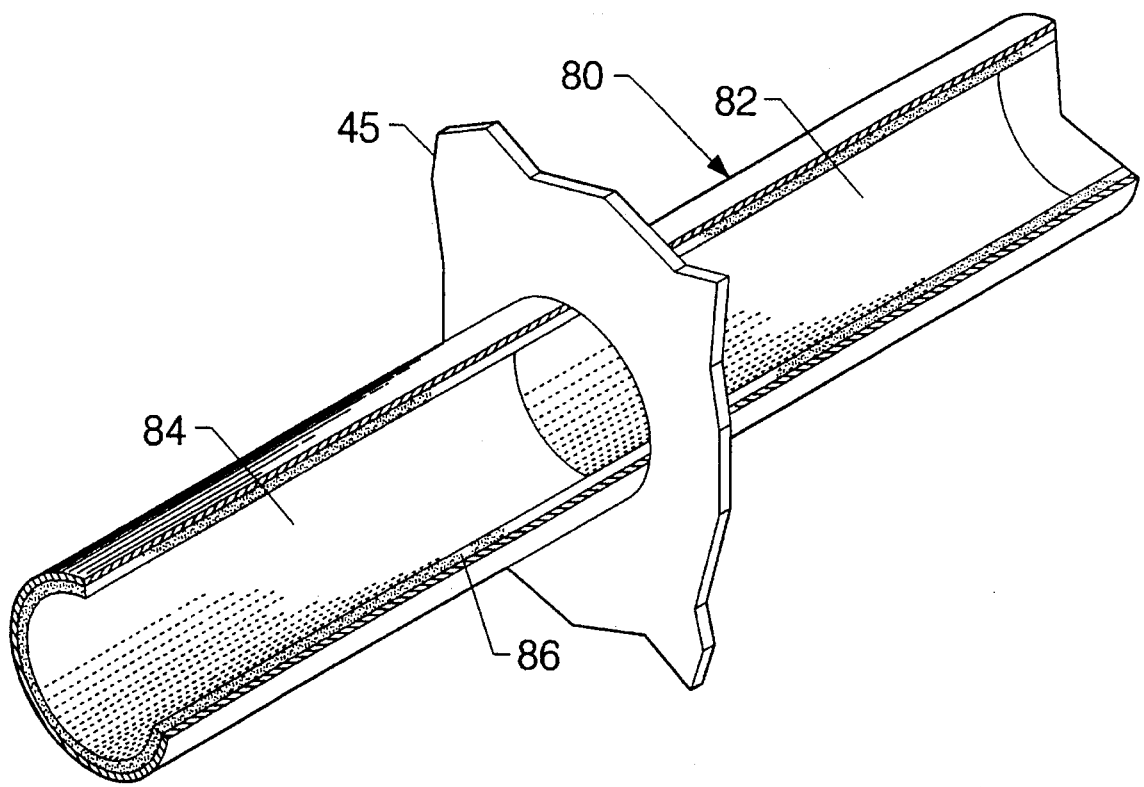
FIG. 3 is a cut away drawing of a heater tube showing the solid adsorbent coating on the interior surface of the heater tube.

FIG. 3 shows a heater tube 80 in a cut away section. The heater tube having a hollow bore with an inside surface is uniformly lined with a solid adsorbent 86. In the operation of the carousel heat exchanger, the heater tubes are functionally separated into a first internal zone 82 and a second internal zone 84 by the positioning of the baffle at a point along the length of the heater tube.

Figure 1B:
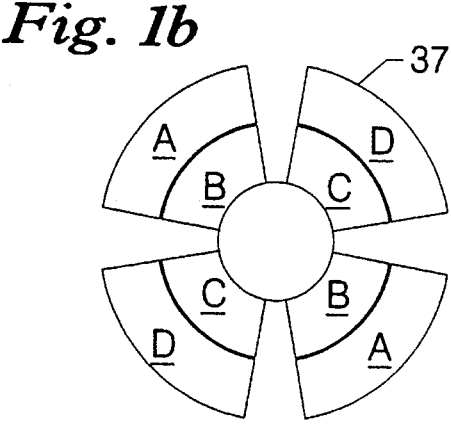
FIG. 1B shows a detail of the flow distributor from the face end of the device.

Returning to FIG. 1a and with respect to the flow distributor 30, the operation of the carousel heat exchanger will now be described. The flow distributors 30 and 35 are divided into flow zones A, B, C, and D by seal zones 25 wherein flow zones A and D are directed to portions of the outer rotational zone and wherein flow zones B and C are directed to corresponding portions of the inner rotational zone. These flow zones direct heat carrier flows into and out of the carousel heat exchanger. The flows may be conducted in any direction or combination of directions, but it is preferred that a hot fluid from a heating source be passed through flow zone A while a second heat carrier, at ambient conditions, be passed through zones B and D, preferably in opposite directions, and that the fluid to be conditioned be passed through zone C. A front view of flow zones A, B, C, and D of the manifold or flow distributor 37 is shown in FIG. 1b. During the passage of the various heat carrier flows, relative position of the manifold and the heater tubes is changed by a means for relative rotation 27 between the manifold and the heater tubes, baffle and vanes about the rotational axis, in the direction shown as 15 in FIG. 1a. As the heater tubes, baffle, and vanes are rotated relatively to the flow distributor about the rotational axis, the seal zones 25 limit the flow through the flow zones to one or more axial flow segments. The relative rotation may be accomplished by a motor drive or belt on the casing or on the inner cylinder (not shown) along the rotational axis, Z.

In the operation of the carousel, the heat carrier flows may be directed through a flow distributor to different portions of the inner and outer rotational zones and different axial flow segments by either rotating the vanes, tubes, and baffle as a unit about the rotational axis, or by maintaining the vanes, tubes, and baffle in a stationary position and rotating a manifold or flow distributor disposed at a face end and a distal end of the heater tube, baffle, and vane assembly. The manifold moving the flow of the heat carrier may include a motor and belt drive or a direct motor drive. In an alternative embodiment, the manifold may include a flow distributor wherein dampers or gates are rotated about the rotational axis to permit the flow of heat carrier to move relative to portions of the axial flow segments.

When the carousel heat exchanger is used to condition air such as in an air conditioning device and the heat carrier fluid is air, with reference to FIG. 1b, preferably the hot fluid A will range in temperature from about 80° C. to about 250° C. Preferably, the temperature of the ambient fluid B and D will range from about 20° C. to about 50° C. to provide a conditioned fluid at a temperature ranging from about 20° C. to about 0° C.

EXAMPLES

The following examples are provided for illustrative purposes and are not intended to limit the scope of the claims that follow.

Example I

A 12 inch portion of the inside surface of a 18 inch length of aluminum tube, ¾" in diameter, was lined with the calcined rare earth exchanged LZ-210 adsorbent according to the coating method disclosed hereinabove. The inside surface tube was sand blasted to clean the surface. The tube was heated to a temperature of about 100° C. in an oxygen containing atmosphere and the tube was spun at a rate of up to about 300 revolutions per minute. A slurry with the following composition: 80% Adsorbent, 7½% Kaolin, 7½% volclay and 5% silica as sodium silicate and about 1% TSPP was poured through the spinning tube. The solids content of the slurry was about 35 wt. % in water, the suspending liquid. The coated tube was then heated at about 550° C. for a period of about one hour to calcine the adsorbent and harden the adsorbent coating. It was found that spinning the tube prior to slurry application improved the uniformity of the coating and resulted in a desired adsorbent density of up to about 10 gm per foot of tubing, equivalent to a thickness of between 1.0 and about 2.0 mm, in a single contacting step.

Example II

The calcined rare earth exchanged LZ-210 adsorbent lined tube of Example I was placed in a steel jacket with a fluid inlet and a fluid outlet and was operated in a sorption cooling process with water as the refrigerant and as the carrier fluid. The mass of the tube was 63.042 grams with an adsorbent loading of 7.8 gm. Two lined tubes were employed in the experiment.

During the experiments, a heated fluid was supplied to one lined tube while supplying ambient temperature fluid to the other tube. Ambient temperature fluid was continuously supplied to both a condensing heat exchanger and an evaporating heat exchanger. One tube was activated at a regeneration temperature of 93° C. or 115° C. while the other was brought to near a saturated state by exposure to the evaporator reservoir at an adsorbent temperature near ambient and the pressure of the system was approximately equal to the vapor pressure of water at the evaporator temperature.

The experimental cycle was begun by applying heated fluid at a selected regeneration or desorption temperature to the saturated tube, putting the saturated tube in generation mode, while the activated tube was maintained at ambient temperature by a cooling stream, putting the activated tube in the adsorber mode. After one-half the cycle time had elapsed, the heating and cooling streams and the valve settings were switched so that the tube which was in the generation mode was now in fluid communication with the evaporator, and the tube which was in the adsorber mode was put in fluid communication with the condenser and an amount of condensate was collected in the condenser receiver. Liquid water was passed to the evaporator where it was evaporated. Heat to evaporate that water was supplied by an air stream.

The tubes were cycled between heating mode and cooling mode in a cycle that required a total time of about 2–3 minutes, equally divided between heating and cooling. The results of the experiments are summarized in Table 1. The condenser temperature was held at 21° C.

TABLE 1

RESULTS PER UNIT VOLUME OF TUBE

|   | Half Cycle time Min | Condensate Vol./Cycle, cc | Regen Temp, °C. (Ave) | Evap Temp, °C. | Volumetric Power W/m³ |
|---|---|---|---|---|---|
| A | 1.5 | 1.06 | 93 | 13.2 | 83,975 |
| B | 1.25 | 0.93 | 93 | 14.8 | 88,577 |
| C | 1.0 | 0.68 | 93 | 15.3 | 80,179 |
| D | 1.5 | 1.21 | 115 | 13.1 | 95,479 |
| E | 1.5 | 1.31 | 115 | 14.9 | 103,704 |

Example III

The cooling power in terms of the mass of adsorbent for the lined tube of Example II is shown in Table 2 as Runs A–E. A comparable system described in an article entitled "Silica Gel/Water Adsorption—Cooling System" by S. H. Cho et at. presented at the Solid Sorption Refrigeration Symposium—Paris, France, Nov. 18–20, 1992, page 107, Table 1, and FIG. 2, page 109 is shown as Cho. From the description of Cho's experiment, Cho employed a half cycle time of 354 minutes, a regeneration temperature of 80° C., a condenser temperature of about 20° C., and an evaporator temperature of about 8.4° C. The lined heater tubes of the present invention were determined to have a specific power, per mass of adsorbent, expressed in W/kg ranging from about 1400 to about 1800, while the packed bed of Cho had only a specific power per mass of adsorbent of about 3.2 W/kg. This demonstrates that despite some losses which will occur in the carousel heat exchanger system due to heat losses between the rotational zones, the use of sorbent lined tubes provides a significant advantage in system power a unit mass of adsorbent and unit volume of tube.

TABLE 2

Comparison of Specific Power/Mass of Adsorbent

| Run | Specific Power/Mass of Adsorbent, (W/kg) |
|-----|------------------------------------------|
| A   | 1,417                                    |
| B   | 1,495                                    |
| C   | 1,363                                    |
| D   | 1,612                                    |
| E   | 1,750                                    |
| Cho | 3                                        |

Example IV

The heat of adsorption for zeolite 13X, an adsorbent employed in the prior art for sorption cooling applications, and a calcined low cerium rare earth exchanged Y-84 (CREY-84) were determined from adsorption isotherm data with water at several temperatures. The adsorption isotherms were developed by sensing changes in pressure and temperature inside a reference volume attached to an adsorption vessel containing the adsorbent sample in a modified BET adsorption apparatus. The adsorbent samples were approximately 5 cm lengths of tubing with a diameter of about 19 mm, lined with 1.2–2.0 mm of adsorbent. A plot of the partial pressure of water as a function of temperature at a constant loading was developed. The heat of adsorption of water over the adsorbent was determined for each adsorbent. The heat of adsorption was then used to determine the specific cooling power of each of the adsorbent systems, integrating the heat adsorption over the loading range of the sorption cooling device. Based on an ambient temperature of 35° C., a regeneration temperature of 93° C., an adsorption temperature of about 40° C., and an evaporation temperature of about 15° C., the energy per pound of water evaporated and the specific cooling power of each adsorbent were determined. The 13X system required the 1626 BTU/lb of water evaporated and delivered 26.8 BTU/lb of adsorbent per cycle. The CREY-84 adsorbent required 1143 BTU/lb of water as energy input and provided about 68.8 BTU/lb of adsorbent per cycle in cooling power. Thus, a sorption cooling system employing CREY-84 adsorbent will require a lower energy input and will provide a higher specific cooling power than provided with zeolite 13X.

I claim:

1. A carousel heat exchanger comprising:
   a) plurality of heater tubes disposed radially about a rotational axis, each of said heater tubes being sealed and having a hollow bore, said hollow bore being uniformly lined with a solid sorbent and containing a refrigerant;
   b) a baffle disposed about said rotational axis, defining an outer zone and an inner zone having said heater tubes passing transversely therethrough, said baffle defining a first internal zone of said heater tubes in said outer zone and a second internal zone of said heater tubes in said inner zone;
   c) a plurality of vanes disposed radially along said rotational axis, and extending transversely through said baffle, said vanes defining a plurality of axial flow segments, that subdivide said inner and said outer zone; and,
   d) a manifold for moving a flow of a heat carrier into a portion of said axial flow segments in said outer and inner zones.

2. The carousel heat exchanger of claim 1 wherein said manifold comprises a flow distributor disposed at a face end and a distal end of said carousel heat exchanger and said axial flow segments are rotated about said rotational axis.

3. The carousel heat exchanger of claim 1 wherein said manifold comprises a flow distributor disposed at a face end and a distal end of said carousel heat exchanger and said flow distributor is rotated about said rotational axis.

4. The carousel heat exchanger of claim 1 wherein the solid sorbent is a zeolite selected from the group consisting of Zeolite A, Zeolite X, Zeolite Y, Zeolite L, chabazite, silicalite, and mixtures thereof.

5. The carousel heat exchanger of claim 4 wherein the zeolite is selected from the group consisting of low cerium rare earth exchanged zeolite Y-84, zeolite Y-54, zeolite Y-85, rare earth exchanged LZ-210.

6. The carousel heat exchanger of claim 1 wherein the heater tubes comprise a high conductivity material selected from the group consisting of aluminum, copper, glass, ceramics, steels, aluminized steels, and alloys thereof.

7. The carousel heat exchanger of claim 1 wherein the refrigerant is selected from the group consisting of water, HCFC, CFC, and HFC refrigerants, propane, butane, ammonia, carbon dioxide, sulfur dioxide, sulfur hexafluoride, light alcohols, and mixtures thereof.

8. The carousel heat exchanger of claim 1 wherein the solid adsorbent comprises a low cerium rare earth exchanged zeolite Y-84 and the refrigerant is water.

9. The carousel heat exchanger of claim 1 wherein the solid adsorbent comprises zeolite Y-54 and the refrigerant is water.

10. The carousel heat exchanger of claim 1 wherein said heater tubes are rigidly disposed on said vanes.

11. The carousel heat exchanger of claim 1 further comprising a means for relative rotation between said manifold and said heater tubes, baffle, and vanes about said rotational axis.

12. The carousel heat exchanger of claim 1 further comprising an inner cylinder disposed along said rotational axis inside said baffle and a casing disposed along said rotational axis outside said baffle wherein said vanes extend from said inner cylinder to said casing said vanes being rigidly attached to said inner cylinder and said casing.

13. A carousel heat exchanger comprising:
   a) a plurality of heater tubes disposed radially about a rotational axis, each of said heater tubes being sealed and having a hollow bore, said hollow bore being uniformly lined with a solid adsorbent and containing a refrigerant;
   b) a baffle having an inside and an outside disposed about said rotational axis, defining an inner zone and an outer zone and having said heater tubes passing transversely therethrough, and said baffle defining a first internal zone of said heater tubes in said outer zone and a second internal zone of said heater tubes in said inner zone;
   c) a plurality of vanes disposed radially along said rotational axis and extending transversely through said baffle, an inner cylinder disposed along said rotational axis inside said baffle and a casing disposed along said rotational axis outside said baffle, said vanes extending from said inner cylinder to said casing, said vanes being rigidly attached to said inner cylinder and said casing, said vanes defining a plurality of axial flow segments; and,
   d) a manifold disposed at a face end and a distal end of said axial flow segments permitting a heat carrier flow to be distributed to a different axial flow segment as said heater tubes, baffle and vanes are rotated together about said rotational axis.

* * * * *